May 21, 1963

T. F. BELLINGER 3,090,898

PROTECTIVE SYSTEM

Filed Aug. 2, 1961

Inventor
Thaddeus F. Bellinger
By W. J. Robertson
Attorney

United States Patent Office 3,090,898
Patented May 21, 1963

3,090,898
PROTECTIVE SYSTEM
Thaddeus F. Bellinger, West Allis, Wis., assignor to Allis-Chalmers Manufacturing Company, Milwaukee, Wis.
Filed Aug. 2, 1961, Ser. No. 128,832
4 Claims. (Cl. 318—170)

This invention relates generally to controls for synchronous motors. This invention relates more specifically to a protective system that deenergizes a synchronous motor if the motor fails to accelerate properly to synchronous speed or if the motor pulls out of synchronism.

The protective device of this invention is intended for a synchronous motor of the type that has a stationary polyphase armature winding and a direct current excited field winding that rotates at synchronous speed with the ampere turns of the armature winding. A synchronous motor of this type will not operate at less than synchronous speed without some additional means. Usually the rotor of a synchronous motor has an auxiliary winding (a squirrel cage winding) that cooperates with the armature winding to form an induction motor for accelerating the motor to synchronous speed. The squirrel cage winding ordinarily has only sufficient thermal capacity to accelerate the motor under normal conditions and the motor will not operate safely as an induction motor for more than a very short time. If for some reason the motor does not accelerate to synchronous speed properly, the armature should be deenergized to prevent overheating the motor. A system that monitors the temperature of the squirrel cage winding and deenergizes the armature winding as the temperature approaches an unsafe limit is called a squirrel cage protective system.

The field winding of a synchronous motor provides a useful but quite round about measure of the temperature of the squirrel cage winding. The exciter is not connected to energize the field winding until the motor has accelerated as an induction motor to nearly synchronous speed. While the motor is accelerating, a voltage is developed in the field winding. This voltage depends partly on transformer action and partly on generator action, and the magnitude of this voltage is a rather complex function of the speed of the rotor. The frequency of the voltage developed in the field winding is called the slip frequency. The slip frequency equals the supply system frequency at starting and approaches zero as the motor accelerates to synchronous speed.

The slip frequency, and to a lesser extent the voltage magnitude, are important indicators of the power that goes into heating the squirrel cage winding, and the rate that heat is removed by cooling. At high slip frequency (e.g. when starting) the current in the squirrel cage winding is very high, and the squirrel cage winding heats rapidly. At low slip frequency (near synchronous speeds) the current is appreciably lower, and at synchronous speed the current in the squirrel cage windings is zero. The motor usually has a fan mounted on the rotor, and the fan cools the motor more effectively as the speed increases. The difference betwen the total heat received and the total heat lost by the squirrel cage winding determines the temperature of the squirrel cage winding. Thus, any device that integrates the slip frequency indicates qualitatively the temperature of the squirrel cage winding.

The slip frequency integrator must follow the heating of the motor very accurately. If the integrator is inaccurate, it will underprotect or overprotect the motor in different operating regions of the motor. Overprotection wastes the costly built-in reserve of the motor, and it may cause the motor to trip out unnecessarily and thereby interrupt important services. Underprotection may allow the motor to be damaged.

The thermal time delay relay is quite often used to integrate the slip of a synchronous motor, and it illustrates the desirable features of a slip integrator and the problems in obtaining these features. An inductor that is connected in parallel with the electrical heating element of the relay provides a voltage across the heating element which is proportional to the slip frequency. The thermal relay is an approximate thermal model of the squirrel cage winding and it heats at about the same rate as the motor. One of the advantages of a thermal relay is that it cools at the same rate that it heats, and it accounts for the temperature of the motor from a recent start. However, the thermal relay has several shortcomings in a protective system for a squirrel cage winding. A thermal relay responds rather slowly to the heating current, regardless of the magnitude of the current. Commercially available relays do not have sufficiently fast response to protect a synchronous motor at maximum slip frequency where the motor can operate safely for only a few seconds. In addition, the thermal relay continues to react to its accumulated heat after the motor has passed through a potentially dangerous operating range, and these relays occasionally trip out the motor when in fact the potential danger to the motor did not materialize. This effect is called "overshoot." Several well known time delay relays have fast response without overshoot. Unfortunately, there is no necessary relation between the suitability of the relay to respond fast without overshoot and the further requirement that the relay react to the voltage of the field winding in the same way that the squirrel cage winding heats. In fact, some of the most promising integrating relays are apparently incompatable with the signal that the field winding provides. The protective system of this invention overcomes this problem.

The protective system of this invention includes a time delay relay that has a high damping factor to prevent overshoot and has fast response for protection at high slip speeds. The system also has an electrical network that receives the signal of the field winding and produces a modified signal that excites the relay to follow the heating of the squirrel cage winding. Preferably, the network is adjustable so that standardized relays can be applied easily to motors that have differing thermal characteristics.

One object of this invention is to provide a new and improved protective device for a motor with a squirrel cage winding.

Another object of this invention is to provide a new and improved squirrel cage protective device that includes a relay with a high damping factor and with fast response.

Another object of this invention is to provide a simple and convenient electrical network that adapts the mechanical and electrical characteristics of a time delay relay to the thermal and electrical characteristics of a motor with a squirrel cage winding.

Another object of this invention is to provide a new and improved protective system that is adjustable to match the characteristics of the standardized relays to motors of differing characteristics.

The drawing and the detailed description of the invention will suggest other objects and advantages.

Figure 1:
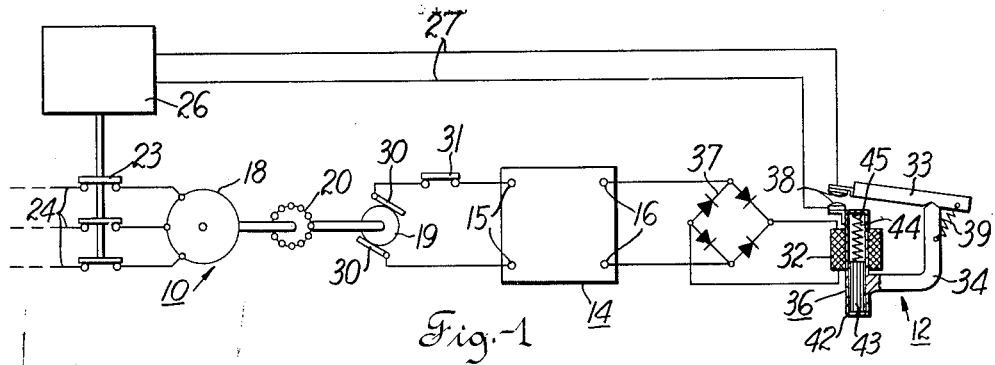
FIG. 1 is a schematic drawing of a motor and the protective system of this invention.

FIG. 1 shows a generalized synchronous motor 10, a specific relay 12, and a generalized network 14 that couples the relay 12 to the motor 10. The network 14 has input terminals 15 connected to receive a signal from the motor 10, and it has output terminals 16 that are connected to transmit this signal in a modified form to the relay 12. The relay 12 and the network 14 make up the protective system of this invention. The motor 10 has an armature winding 18, a field winding 19, and a squirrel cage winding 20. A switch 23 connects the armature winding 18 to a polyphase alternating current system 24. A switch operator 26 opens and closes the switch 24 to control the motor 10. The relay 12 is connected by conductors 27 to open the switch 23 when the relay 12 closes. During starting the armature winding 18 cooperates with the squirrel cage winding 20 to form an induction motor. While the motor 10 is accelerating to synchronous speed, the field winding 19 produces an electrical signal that contains information about the heating rate of the motor. Slip rings 30, connect the field winding to an exciter (not shown) when the motor has accelerated to nearly synchronous speed. During acceleration, the slip rings 30 connect the field winding 19 through a switch 31 to the network 14.

The relay 12 includes a magnetic coil 32, a pivotable armature 33, a frame 34 and a viscous damped time delay element 36. A full wave rectifier 37 connects the coil 32 to be energized through the network 14. The rectifier 37 prevents the relay 12 from opening during current zeros at low slip frequency. One end of the armature 33 is pivotally connected to the frame 34. The armature 33 and the frame 34 carry cooperating contacts 38. A spring 39 normally holds the armature 33 and the contacts 38 open.

The time delay element 36 comprises a nonmagnetic closed tube 42, a magnetic plunger 43 positioned inside the tube, oil 44 which slows the movement of the plunger in the tube, and a spring 45 which tends to hold the plunger in the position of FIG. 1. The coil 32 is positioned on the tube 42 to produce a magnetic flux in the armature 33, the frame 34, the plunger 43, and the air gap between the armature and the plunger.

Plunger 43 is in the starting position of FIG. 1 when the switch 23 is first closed, and the large air gap between the plunger and the armature 33 prevents the coil 32 from closing the armature. During the time delay, the coil operates only on the plunger 43 inside the oil filled tube 42, and the plunger 43 moves toward the armature as the coil is energized. As the plunger 43 nears the armature 33, the magnetic field increases, and at a selected position of the plunger the armature swings closed. When the armature 33 closes, the contacts 38 complete the circuit 27 to the switch operator 26, and the switch operator opens the switch 23 and deenergizes the motor 10.

As is well known, the relay 12 has an inverse time delay characteristic. It requires a shorter time to close if more current is supplied to the coil 32. Since the relay is intended to follow the motor heating, the velocity of the plunger 43 as a function of current more directly relates the relay characteristics to the problem of the protective system than does the more commonly used inverse time characteristic.

Figure 2:
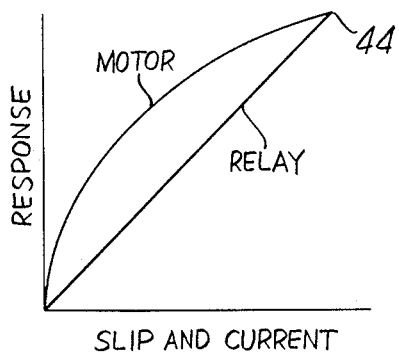
FIG. 2 is a graph showing characteristics of the motor and of components of the protective system of FIG. 1.

Since the velocity of the plunger 43 in the oil filled tube 42 is a function of the current in the coil 32, the position of the plunger indicates the integration of the current in the coil 32 with respect to time. Thus, if the current that the field winding 19 supplies to the coil 32 is proportional to the heating rate of the motor, the coil would advance the time delay element 36 at a rate corresponding to motor heating, and the position of the plunger would indicate the heat accumulated by the motor 10 during starting. In fact, the electrical signal at the slip rings 30 does not suitably relate the electrical and mechanical characteristics of the relay 12 to the thermal and electrical characteristics of the motor 10. The network 14 provides this link. As already mentioned, the motor heating rate is nonlinear with respect to slip frequency. The velocity of the plunger 43 on the other hand is a nearly linear function of current in the coil 32, within the range of FIG. 2. FIG. 2 illustrates these two characteristics in a common coordinate system. As FIG. 2 shows, the problem of the network 14 is to transform the slip frequency signal at the slip rings 30 to a current signal having the shape of the motor heating characteristic. The relay response (specifically the velocity of the plunger 43) to current and the motor response (heating) to slip are drawn to different scales that are arbitrarily selected so that the characteristics intersect at the point 44 of maximum slip. Since the relay responds nearly linearly to current, as FIG. 2 shows, the current output at the terminals 16 of the network 14 indicates the relay response to the signal at the slip rings 30. Thus the response of the network 14 indicates the response of the relay 12.

Figure 3:
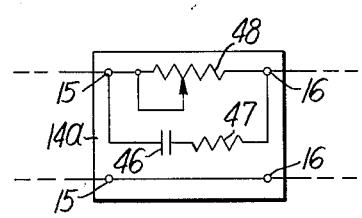
FIG. 3 is a detail schematic drawing of a component of the protective system.
Figure 4:
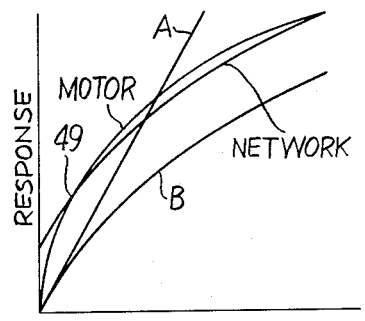
FIG. 4 is a graph showing characteristics of the motor and a component of the protective system.

FIG. 3 shows one specific network 14a comprising a capacitor 46 and a resistor 47 connected in series, and a variable resistor 48 connected in parallel with the series resistor and capacitor combination. All or a portion of the resistor 47 and a portion of the resistor 48 represents the resistance of the coil 32. The resistor 48 is at least partially a discrete resistance, and it is preferably variable. Thus, the network 14a and the voltage at the slip rings 30 establish the magnitude of the current in the coil 32 and thereby establish the force on the plunger 43. FIG. 4 shows the effect on the network response of the capacitor 46 alone (curve A), the capacitor 46 and resistor 47 alone (curve B), and combination of the capacitor 46 and the resistors 47, 48 (curve "Network"). In the example of FIGS. 3 and 4, the network 14a accurately follows the motor heating at starting and at the point 49 near synchronous speed where the switch 31 opens and the motor 10 begins synchronous operation. In between these points the network 14a and the relay 12 closely but not exactly follows the motor heating.

As FIG. 4 shows, the capacitor 46 and resistor 47 cooperate to establish the shape of the curve and the resistor 48 cooperates with the resistor 47 and capacitor 46 combination to move the characteristic of the network 14a along the response axis. It is highly desirable to use a variable resistor as at least a portion of the resistor 48. The network 14a can then be made of standardized components and the variable resistor 48 can be adjusted to adapt the relay characteristics to motors having a wide range of characteristics.

Figure 5:
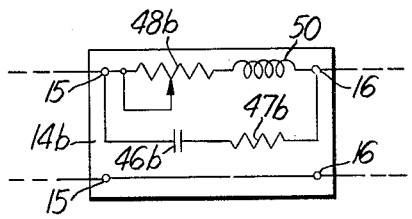
FIG. 5 is another embodiment of the component of FIG. 3.

FIG. 5 shows a more general example 14b, of the network 14. The network 14b of FIG. 5 has a capacitor 46b and two resistors 47b, 48b that are similar in their circuit arrangement to the network 14a but have somewhat different values than the corresponding components of the network 14b. In addition, the network 14b has an inductor 50 in series with the resistor 48.

The inductor 50 tends to eliminate the effect of the resistor 48 at high slip frequency. Consequently, the capacitor 46b may have somewhat higher capacitance than the corresponding capacitor 46 of the network 14a and still provide the same current at starting at and near synchronous speed. The values of the network 14b are selected to provide the same current at starting as the network 14a, and the network 14b provides somewhat higher current throughout most of the motor operating range and thus more closely follows the motor thermal speed characteristics.

So far FIGS. 2 and 4 have been described as though the magnitude of the voltage across the slip rings 30 is constant as the motor 10 accelerates. In fact, the voltage magnitude is relatively constant over the range in which the motor 10 acts as an induction motor and the analysis thus far of FIGS. 2 and 4 is satisfactory for many protective systems. However, it is preferable that the network 14 link the closing characteristics of the relay 12 to both the frequency and the magnitude characteristics of the signal at the slip rings 30. The relation between the voltage magnitude and the motor speed cannot be easily generalized as the relation between the slip frequency and the motor speed has been. In FIG. 4 the response of the network 14 is the response to both the voltage magnitude and the frequency, but for generality the horizontal axis is expressed only as slip. For any particular motor there is a definite voltage magnitude for each value of slip frequency. Thus, voltage magnitude is a function of slip frequency. One technique for constructing the network response curve of FIG. 4 is to solve the circuit for the response to selected frequencies and to the voltage magnitude that occurs at these frequencies.

When the switch 23 is closed, the armature winding 18 and the squirrel cage winding 20 cooperate to accelerate the motor. During acceleration the squirrel cage winding heats appreciably, although not necessarily dangerously. The field winding 19 energizes the network 14, and the network 14 produces a current that varies in magnitude with the heating rate of the motor. The current in the coil 32 gives the plunger 43 a velocity that is closely proportional to the current and thereby closely proportional to the heating rate of the motor. The plunger 43 moves toward the closing point of the relay 12 as the temperature of the motor 10 approaches the acceptable temperature limit. In the usual situation the motor 10 reaches nearly synchronous speed before the motor heats dangerously and before the relay 12 closes. A control called the synchronizing relay (not shown) opens the switch 31 to isolate the protective system from the field winding and the control connects the field winding 19 to its exciter for synchronous operation. The spring 45 then returns the plunger 43 slowly to the position of FIG. 1.

If the motor is stopped and then restarted before the plunger 43 has returned, the relay would operate in the way just described except that plunger would start from a position that corresponds to heat still retained by the motor from the previous start. In addition, each operation heats the oil 44 and thereby temporarily reduces its viscosity. Thus, the relay 12 closes faster if the motor is still heated from a previous start.

If the motor 10 fails to accelerate properly, the field winding 19 and the network 14 supply a high current to the coil 32 long enough for the relay 12 to close. At very low speeds, the relay closes within a few seconds. When the relay 12 closes, it completes the circuit of the conductors 27, and the switch operator 26 opens the switch 23 to prevent further improper operation of the motor 10.

The oil damped relay 12 is a very significant element in the protective system. However, other relays may be more or less suitable. The most important requirements of such a relay are that the relay has good response to high input signals (i.e. in the right hand region of FIG. 2) that the relay has a high damping factor to prevent overshoot, and that the relay takes into consideration the temperature of the motor that is due to a previous start.

The protective system is particularly intended for a synchronous motor because the field winding conveniently provides a slip frequency signal. The system is also suitable for an induction motor when a suitable means such as a tachometer provides a signal having a predetermined magnitude and frequency relation to the motor speed.

In the specific protective system that has been described, the field winding 19, the network 14, and various other impedances act somewhat as a current source. Those skilled in the art will recognize that the network 14 and the field winding 19 can also be connected and described as a voltage source.

Those skilled in the art will recognize other variations in the protective system, and the claims are intended to cover variations within the spirit of the invention.

Having now particularly described and ascertained the nature of my said invention and the manner in which it is to be performed, I declare that what I claim is:

1. A protective system for a synchronous motor having a field winding and having a starting means that is operable safely for a limited time that is a function of motor speed, comprising a relay having an inverse time delay characteristic and being operable to deenergize the motor after a time delay that is an inverse function of the energization of said relay, and an electrical network for coupling said relay to be energized by the field winding of the synchronous motor during starting, said network comprising the parallel combination of a capacitor and a resistor, said parallel combination connected to adapt the time delay characteristics of the relay to the voltage and frequency characteristics of the field winding for causing said relay to follow the heating of the starting means.

2. A protective system for a motor having a squirrel cage winding and having means producing an electrical signal indicating by its frequency and magnitude the speed of the motor, said system comprising a time delay relay having a predetermined closing response to an electrical signal, means coupling said relay to receive the speed indicating signal, said means comprising a capacitor and a resistor connected in parallel to modify the speed indicating signal to match the response of said relay to the heating characteristics of the motor to close the relay when the motor approaches a dangerous temperature condition, and means connecting said relay to deenergize the motor when the relay closes.

3. A protective system for a synchronous motor having a field winding for operation at synchronous speed and having a squirrel cage winding for operation at subsynchronous speed, comprising a relay having a viscous damped magnetic time delay element and a coil advancing said time delay element at a rate that varies with the energization of said coil, and an electrical network including the parallel combination of a capacitor and a discrete resistance, said network coupling said coil to the field winding and cooperating with the field winding to form a source of current for energizing said coil to advance said time delay element according to the heating rate of the squirrel cage winding, and means connecting the relay to deenergize the synchronous motor at the end of the time delay.

4. A protective system for the starting winding of a synchronous motor having a field winding energized by direct current when the motor is in synchronous operation, comprising a relay having a viscous damped magnetic time delay element and a coil advancing said element toward closing at a rate that is established by the current in said coil, an electrical network coupling said coil to the field winding during starting, said network comprising a capacitor and a resistor connected in parallel and cooperating with the field winding to provide a current for said coil which is proportional to the heating rate of the starting winding, said resistor being variable over a range to adapt the response of said relay to synchronous motors that heat differently in response to motor speed, and means connecting said relay to deenergize the synchronous motor when the time delay element has advanced to close the relay.

No references cited.